United States Patent [19]

Shannon

[11] Patent Number: 5,239,803
[45] Date of Patent: Aug. 31, 1993

[54] SINGLE-COMPONENT-TYPE STRUCTURAL SYSTEM

[76] Inventor: Stephen J. Shannon, 433 Crafton Ave., Pitman, N.J. 08071-2303

[21] Appl. No.: 788,770

[22] Filed: Nov. 7, 1991

[51] Int. Cl.$^5$ .......................... E04C 3/30; E04H 12/00
[52] U.S. Cl. .................................. 52/653.1; 403/170; 403/341; 403/381; 52/645; 52/726.3; 52/646
[58] Field of Search ................. 52/648, 646, 726, 645; 403/170, 171, 176, 341, 381, 219

[56] References Cited

U.S. PATENT DOCUMENTS

| | | |
|---|---|---|
| 1,531,542 | 3/1925 | Cogshall . |
| 1,898,297 | 2/1933 | Fox . |
| 2,156,155 | 4/1939 | Howard ............................ 52/648 |
| 3,005,282 | 10/1961 | Christiansen . |
| 3,132,443 | 5/1964 | Kuhn . |
| 3,168,793 | 2/1965 | Gibson . |
| 3,199,246 | 8/1965 | Fischer . |
| 3,374,917 | 3/1968 | Troy . |
| 3,413,752 | 12/1968 | Perry . |
| 3,456,413 | 7/1969 | Fischer ............................. 52/591 |
| 3,479,763 | 11/1969 | Fischer . |
| 3,513,588 | 5/1970 | Fischer . |
| 3,513,589 | 5/1970 | Fischer . |
| 3,513,590 | 5/1970 | Fischer . |
| 3,731,422 | 5/1973 | McFarland . |
| 3,811,219 | 5/1974 | Fischer . |
| 3,985,083 | 10/1976 | Pofferi ............................. 403/381 |
| 4,035,977 | 7/1977 | Fischer . |
| 4,084,344 | 4/1978 | Asano . |
| 4,610,563 | 9/1986 | Ostergaard ..................... 403/381 |
| 4,895,544 | 1/1990 | Fischer . |
| 4,932,916 | 6/1990 | Blickle . |
| 5,000,713 | 3/1991 | Cheng . |
| 5,044,137 | 9/1991 | Shigeru et al. .................. 52/648 |

FOREIGN PATENT DOCUMENTS

| | | |
|---|---|---|
| 539143 | 11/1931 | Fed. Rep. of Germany . |
| 210452 | 9/1940 | Switzerland ..................... 403/170 |

*Primary Examiner*—James L. Ridgill, Jr.
*Attorney, Agent, or Firm*—Woodcock, Washburn, Kurtz, Mackiewicz & Norris

[57] ABSTRACT

A symmetrical structural component (FIGS. 1A–1D), which when replicated can be used to create a 2- or 3-dimensional framework. Each end of the component comprises two projections 10 that serve as the primary means for multiple component coupling; two internal recesses 12, perpendicular to the projections, for linear coupling; four perimeter recesses 14 for perpendicular coupling; four perimeter members 16, which form the perimeter recesses and have laterally extended portions 19, for perpendicular coupling; and two notches 18 for perpendicular coupling.

25 Claims, 4 Drawing Sheets

SINGLE-COMPONENT-TYPE STRUCTURAL SYSTEM

FIELD OF THE INVENTION

The present invention is generally related to structural systems and structural components (also called structural members). The present invention is more particularly related to a single-component-type structural system.

BACKGROUND OF THE INVENTION

Widely used methods of building employ a structural grid or framework based upon the principals of post and beam construction. Numerous methods of joining the components (posts and beams) of a structural system have been employed. These methods include the use of connector pieces or other accessories to join the components together. However, the quantity and variety of pieces necessary to assemble a system of this type create many problems:

Complexity: The more pieces required to assemble a system the more difficult it is for the user to understand the process of assembly.

Assembly Time: The more pieces required to connect the primary members of a system to one another the more time is required to complete the assembly.

Configurations: The flexibility to create a variety of different configurations with a multi-component system is limited by the quantity of each component type.

Unused Pieces: A system comprising different post, beam, and connector pieces is dependent upon the right number of each piece. The loss of one component piece can render many other components unusable.

Component Orientation: The orientation of two components relative to one another is quite often difficult to ascertain. This is especially true in multi-component-type systems.

Accordingly, a primary goal of the present invention is to provide improved structural members or components for use in a structural grid/framework building system. Further goals are to simplify the connection between the respective components of a building system while maintaining the structural integrity of the connection, and to provide a building system with only a single type of necessary structural component (referred to herein as a single-component-type system). The latter feature would simplify assembly and mitigate the problem of lost parts, while maintaining flexibility to create a wide variety of configurations.

SUMMARY OF THE INVENTION

The present invention achieves the aforementioned goals by providing novel means for coupling structural members in creating a structural grid or framework. Coupling members in accordance with the invention comprise a butterfly-type projecting member comprising first and second projecting members each having a cross-section tapered from a narrow end to a wide end and disposed with respect to one another such that (i) the narrow end of the first projecting member is separated from the narrow end of the second projecting member by a small gap and (ii) first and second internal recesses are formed between the first and second projecting members. The coupling members further comprise first, second, third and fourth perimeter members disposed around the butterfly-type projecting member such that first and second perimeter recesses are respectively formed adjacent the wide ends of the first and second projecting members and third and fourth perimeter recesses are respectively formed adjacent the first and second internal recesses.

In one preferred embodiment of the invention the butterfly-type coupler and the first, second, third and fourth perimeter members are arranged such that the coupling member is substantially symmetrical about a plane passing through its center. This feature simplifies both the manufacture of components and the procedure for coupling individual components together. Further, the first and second projecting members each have a substantially triangular cross-section including a right angle. This feature adds to the strength of the connection when two or more structural members are linearly coupled (i.e., coupled end to end). In addition, the first and second projecting members each include a notched portion, and the first, second, third and fourth perimeter members may each include a laterally extended portion adapted to cooperate with the notched portion of another structural member to further facilitate coupling with that other member. In the preferred embodiment the first and second projecting members extend a distance D1 above the perimeter members (see FIG. 1B). In that embodiment the perimeter members are of a substantially equal length L, the distance D1 is less than or equal to L, the perimeter recesses are of a substantially equal depth D2 (see FIG. 1A), and the distance D1 and the length L are less than or equal to D2.

The present invention also encompasses structural components comprising a beam portion having first and second ends, a first coupling portion attached to or integral with the first end and a second coupling portion attached to or integral with the second end. The length of each component is identical, however the shape of each component could be straight, curved or angled. Each coupling portion comprises structure as described above, e.g., a butterfly-type projecting member and first, second, third and fourth perimeter members.

The present invention also encompasses systems for building a two- or three-dimensional framework. Such systems comprise a plurality of substantially identical structural components each of which comprises a beam portion and substantially identical coupling means at each end of the beam portion for linearly and/or perpendicularly interconnecting the beam portion with another beam portion. One embodiment of such a building system further comprises at least one origination/termination component comprising a substantially flat portion and coupling means for coupling to a structural member. The system may also include a baseboard comprising means for receiving a plurality of structural components. Further, the system may also include a variety of panels which may be affixed to the sides of the assembled components. The beam portions may comprise first, second, third and fourth beam members respectively aligned with the first, second, third and fourth perimeter members. Alternatively the beam portions may comprise substantially solid beams and/or substantially hollow beams.

The present invention provides a single structural-component-type structural system comprising structural components having ends formed in a manner such that, when the component is replicated, as many as six components may be connected at right angles to one another without connectors or accessory pieces. Such a structural component is less complex, takes less time to assemble, provides a maximum number of configurations, results in no unused pieces, and simplifies decisions on how the components should be oriented.

An important feature of the present invention is the stability of the end-to-end, or linear, connections: The interlock of the coupling members of each structural component forms a solid core for the connection. Further, when two linearly-coupled (vertical) components are engaged with perpendicularly-coupled (horizontal) components, the horizontal components are locked into place and cannot be removed until the vertical components are separated.

The present invention may be applied to numerous fields of construction and manufacturing. Various levels of tolerances may be employed, dependent upon the specific application of the system and the materials and methods employed in fabricating the structural components. To this end the design of the components may be refined to achieve maximum structural stability, as would be necessary, e.g., for a scaffolding system. On the other hand, the design of the components may be simplified to achieve cost effective replication, as would be desirable for a construction toy. Other features and advantages of the present invention are described below.

DETAILED DESCRIPTION OF PREFERRED EMBODIMENTS

Figure 1A:
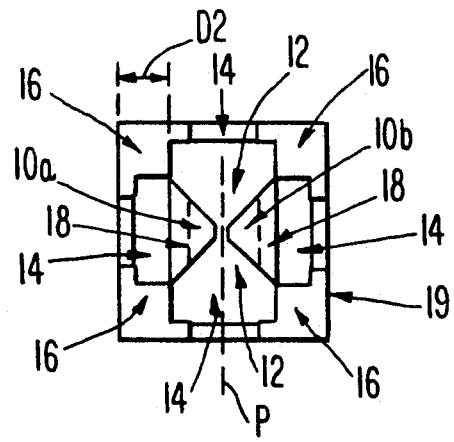
FIGS. 1A-1D depict top, first side, second side and perspective views, respectively, of a structural member in accordance with the present invention.
Figure 1B:
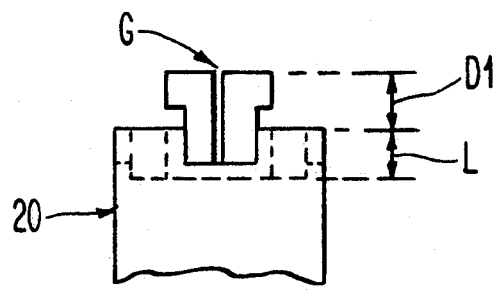
Figure 1C:
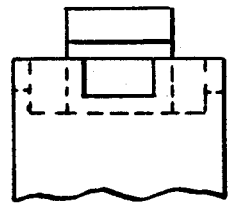

The present invention is based upon a single structural component type of symmetrical design (see FIGS. 1A-1D) which, when replicated, can be used to create a 2- or 3-dimensional framework. A typical component, or member, is symmetrical about a plane through its center and may have a square, rectangular or circular cross-sectional shape (the embodiment of FIGS. 1A-1D has a square cross-sectional shape). Each end of the component comprises:

Two (2) projections 10, referred to herein as butterfly-type projecting members, which serve as the primary means for multiple component coupling. The projecting members 10 are separated at their narrow ends by a small space, or gap, G. This gap may in fact be nonexistent (i.e., the projecting members 10 may touch) when the component is not coupled to another component. However, the gap is necessary when the component is linearly coupled to another component.

Two (2) internal recesses 12, which are perpendicular to the projections 10 and are used for linear coupling.

Four (4) perimeter recesses 14, for perpendicular coupling.

Four (4) perimeter members 16, which form the perimeter recesses and have laterally extended portions 19, for perpendicular coupling.

Two (2) notches 18 (one on each projection 10), for perpendicular coupling.

Figure 3:
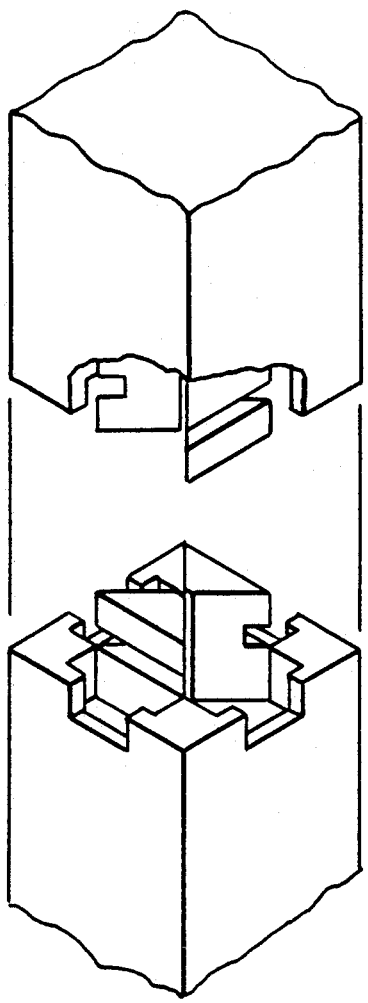
FIG. 3 depicts how two structural members of the type shown in FIGS. 1A-1D may be coupled to form a linear connection.
Figure 4:
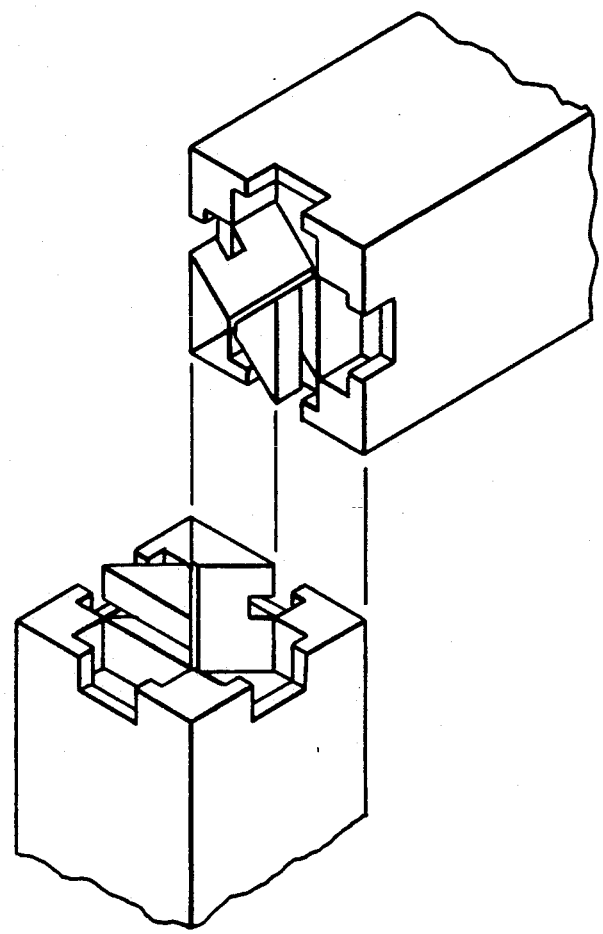
FIG. 4 depicts how two structural members of the type shown in FIGS. 1A-1D may be coupled to form a perpendicular connection.
Figure 5:
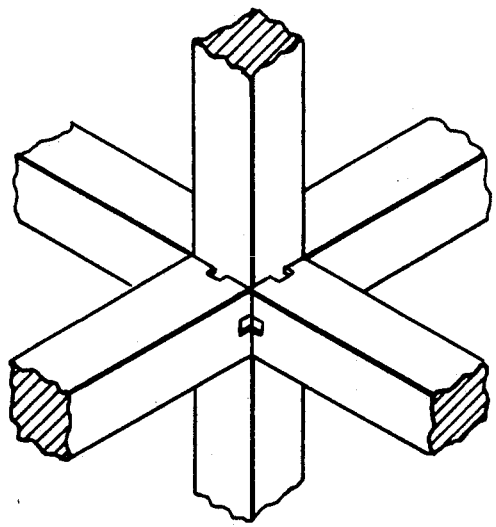
FIG. 5 depicts an assembly of six structural members of the type shown in FIGS. 1A-1D.
Figure 6:
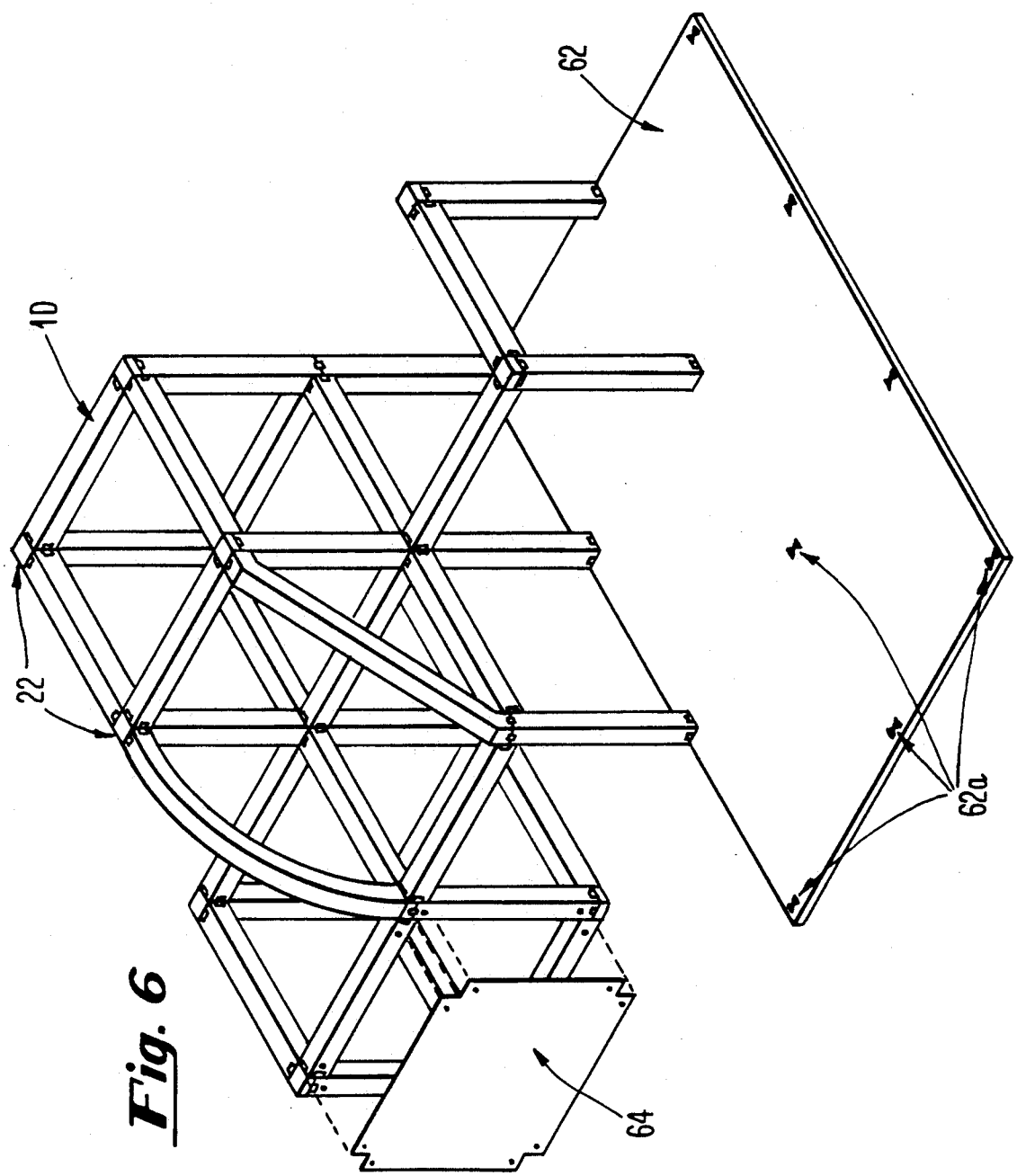
FIG. 6 depicts a three-dimensional framework comprising a plurality of structural members, including straight, curved and angled members, a baseboard and a side panel.

The following assembly process may be carried out to assemble a system substantially composed of only the single component type described above (e.g., a system of the type depicted in FIG. 6): Four horizontal components are perpendicularly coupled to, i.e., slid down onto, a fifth, vertical component at the respective sides of the vertical component, as shown in FIG. 4 (for simplicity only one horizontal component is shown in FIG. 4). A sixth, vertical component is then slid down to engage the other components (FIG. 3) and complete the assembly (FIG. 5). Additional horizontal and vertical components may be added to extend the system in three dimensions (FIG. 6).

A modification to the system would be the inclusion of an additional component type 22 (see FIGS. 2 and 6), which would serve as both an origination and a termination piece. The origination/termination piece 22 is identical in cross-section to the component of FIGS. 1A-1D, however it is shorter and has a coupling means at only one end, the other end being flat. Including the origination/termination piece 22 in the system would strengthen the connections around the periphery of the system and expand the system's capabilities.

Figure 7A:
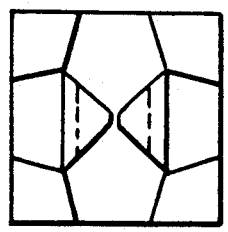
FIGS. 7A-7C and 8A-8C depict alternative embodiments of the coupling means of the present invention.
Figure 7B:
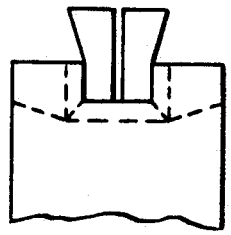
Figure 7C:
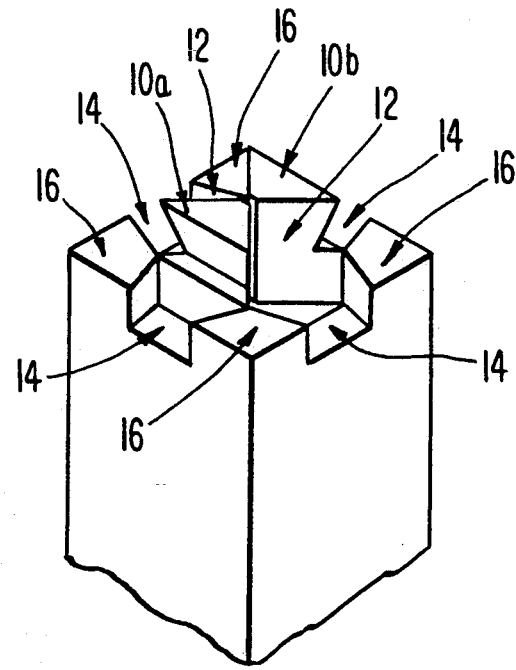
Figure 8A:
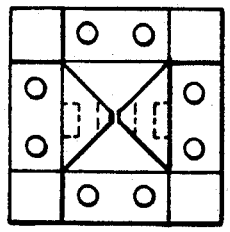
Figure 8B:
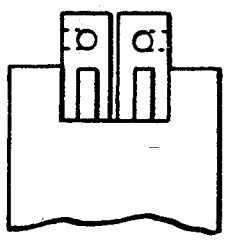
Figure 8C:
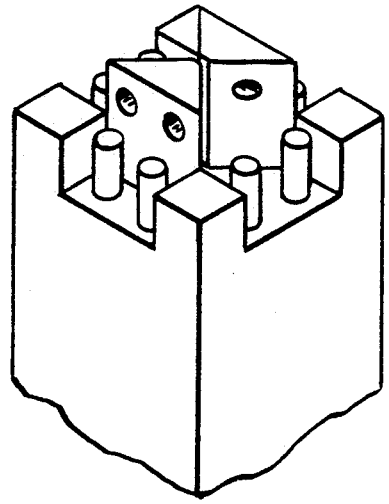

A further modification to the system would be the inclusion of a baseboard 62 (FIG. 6) containing recesses for receiving the dual projections 10 of a typical component. The recesses would preferably be spaced a distance equal to the length of the typical component. A still further modification to the system would be to incorporate a dovetail (see FIGS. 7A-7C) or peg and hole (FIGS. 8A-8C) method of connection in place of the notches and laterally extended portions described above. Such methods may be simpler to fabricate and/or better suited for a particular use.

In sum, preferred embodiments of coupling members in accordance with the present invention comprise a butterfly-type projecting member 10 comprising first and second projecting members 10a, 10b (see FIG. 1D) each having a cross-section tapered from a narrow end to a wide end and disposed with respect to one another such that (i) the narrow end of the first projecting member is adjacent the narrow end of the second projecting member (i.e., touching the narrow end of the second projecting member or separated from the narrow end of the second projecting member by a small gap G (FIG. 1B)) and (ii) first and second internal recesses 12 are formed between the first and second projecting members. The coupling members further comprise first, second, third and fourth perimeter members 16 disposed around the butterfly-type projecting member such that first and second perimeter recesses are respectively formed adjacent the wide ends of the first and second projecting members and third and fourth perimeter recesses are respectively formed adjacent the first and second internal recesses. The projecting members and perimeter members are attached to or integral with a common base 20 (see FIG. 1B).

Figure 2:
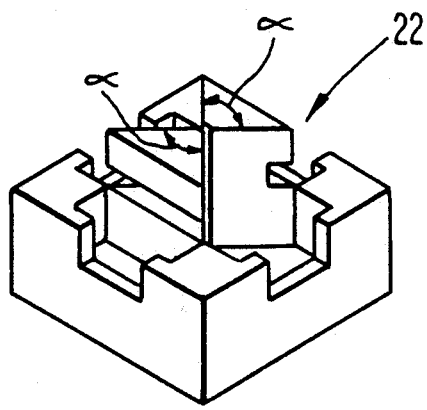
FIG. 2 depicts an origination/termination piece in accordance with the present invention.
Figure 1D:
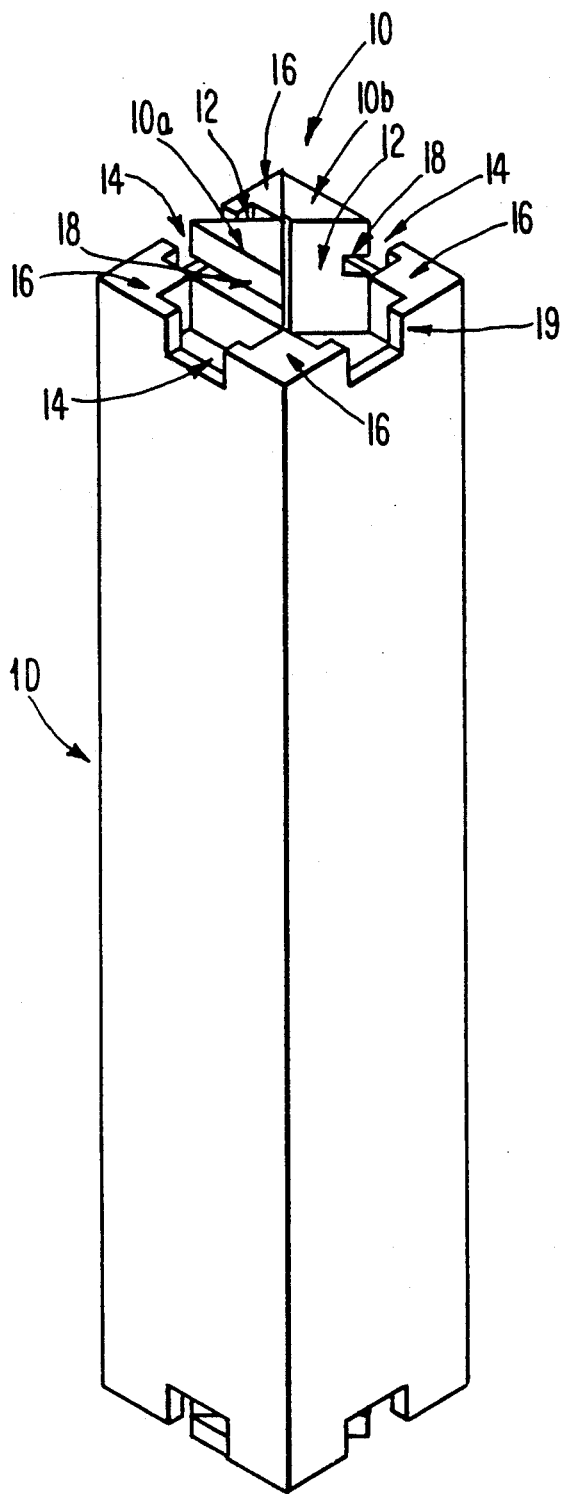

Preferably, the butterfly-type member 10 and the first, second, third and fourth perimeter members 16 are arranged such that the coupling member is substantially symmetrical about a plane P passing through its center (see FIG. 1A). Further, the first and second projecting members each having a substantially triangular cross-section including a right angle α (see, e.g., FIG. 2). This feature adds to the strength of the connection when two or more structural members are linearly coupled (i.e., coupled end to end). In addition, the first and second projecting members each include a notched portion 18, and the first, second, third and fourth perimeter members may each include a laterally extended portion 19 adapted to cooperate with the notched portion of another structural member to further facilitate coupling with that other member. Preferably, the first and second projecting members extend a distance D1 above the perimeter members (see FIG. 1B). The perimeter members are of a substantially equal length L, the distance D1 is less than or equal to L, the perimeter recesses are of a substantially equal depth D2 (see FIG. 1A), and the distance D1 and the length L are less than or equal to D2.

The present invention also encompasses structural components comprising a beam portion 1D (see FIGS. 1D and 6) having first and second ends, a first coupling portion attached to or integral with the first end and a second coupling portion attached to or integral with the second end. The length of each component is identical, however the shape of each component could be straight, curved or angled (see FIG. 6). Each coupling portion comprises structure as described above, e.g., a butterfly-type projecting member and first, second, third and fourth perimeter members.

The present invention also encompasses systems for building a two- or three-dimensional framework. Such systems comprise a plurality of substantially identical structural components each of which comprises a beam portion and substantially identical coupling means at each end of the beam portion for linearly and/or perpendicularly interconnecting the beam portion with another beam portion (FIG. 6). One embodiment of such a building system further comprises at least one origination/termination component 22 comprising a substantially flat portion and coupling means for coupling to a structural member. The system may also include a baseboard 62 comprising means 62a for receiving a plurality of structural components. Further, the system may also include a variety of panels 64 which may be affixed to the sides of the assembled components. The beam portions may comprise first, second, third and fourth beam members (not shown) respectively aligned with the first, second, third and fourth perimeter members. Alternatively, the beam portions may comprise substantially solid beams and/or substantially hollow beam. Solid beams are shown in the drawings.

The present invention may be applied in numerous fields, including architecture, furniture, electronics (e.g., connectors), and especially toy construction sets. The single-component-type structural framework system of the present invention is a building system which is easily comprehended by anyone, even a young child. The process of assembly requires minimal decisions on the part of the user, requires no tools, requires no accessory pieces (the baseboard, side panels and origination/termination pieces are optional), and can be completed very quickly. Perhaps most importantly, structural members embodying the present invention may be easily assembled into a rigid and stable framework. Finally, although specific exemplary embodiments of the invention are presented herein, those examples are not to be construed as limiting the scope of the invention. For example, the shape of the projections 10 could be other than triangular; the notches in the projections could be shaped differently; one rather than two projections could be used (though less stable), etc.

What is claimed is:

1. A coupling member, comprising:
   (a) a butterfly-type projecting member comprising first and second projecting members each having a cross-section tapered from a narrow end to a wide end and disposed with respect to one another such that (i) the narrow end of said first projecting member is adjacent the narrow end of said second projecting member and (ii) first and second internal recesses are formed between said first and second projecting members; and
   (b) first, second, third and fourth perimeter members disposed around said butterfly-type projecting member such that first and second perimeter recesses are respectively formed adjacent the wide ends of said first and second projecting members and third and fourth perimeter recesses are respectively formed adjacent said first and second internal recesses;
   said projecting members and perimeter members being attached to or integral with a common base.

2. The coupling member recited in claim 1, wherein said butterfly-type projecting member and said first, second, third and fourth perimeter members are arranged such that the coupling member is substantially symmetrical about a plane passing through its center.

3. The coupling member recited in claim 2, wherein said first and second projecting members each have a substantially triangular cross-section.

4. The coupling member recited in claim 3, wherein the respective cross-sections of said first and second projecting members each include a right angle.

5. The coupling member recited in claim 2 or claim 4, wherein said first and second projecting members each include a notched portion.

6. The coupling member recited in claim 5, wherein said first, second, third and fourth perimeter members each include a laterally extended portion.

7. The coupling member recited in claim 6, wherein said first and second projecting members extend a prescribed distance D1 above said first, second, third and fourth perimeter members, said perimeter members are of a substantially equal length L, and the distance D1 is less than or equal to said length L.

8. A structural component, comprising:
   (a) a beam portion having first and second ends; and
   (b) a first coupling portion attached to or integral with said first end and a second coupling portion attached to or integral with said second end, each of said coupling portions comprising:
   a butterfly-type projecting member comprising first and second projecting members each having a cross-section tapered from an arrow end to a wide end and disposed with respect to one another such that (i) the narrow end of said first projecting member is adjacent the narrow end of said second projecting member and (ii) first and second internal recesses are formed between said first and second projecting members; and
   first, second, third and fourth perimeter members disposed around said butterfly-type projecting member such that first and second perimeter recesses are respectively formed adjacent the wide ends of said first and second projecting members and third and fourth perimeter recesses are respectively formed adjacent said first and second internal recesses; said projecting members and perimeter members of said first coupling portion being attached to or integral with said first end of said beam portion and said projecting members and perimeter members of said second coupling portion being attached to or integral with said second end of said beam portion.

9. The structural component recited in claim 8, wherein said beam portion comprises a substantially solid beam.

10. The structural component recited in claim 8, wherein said butterfly-type projecting member and said first, second, third and fourth perimeter members are arranged such that the coupling portion is substantially symmetrical about a plane passing through its center.

11. The structural component recited in claim 10, wherein said first and second projecting members each have a substantially triangular cross-section.

12. The structural component recited in claim 11, wherein the respective cross-sections of said first and second projecting members each include a right angle.

13. The structural component recited in claim 12, wherein said first and second projecting members each include a notched portion.

14. The structural component recited in claim 13, wherein said first, second, third and fourth perimeter members each include a laterally extended portion.

15. The structural component recited in claim 14, wherein said first and second projecting members extend a prescribed distance D1 above said first, second, third and fourth perimeter members, said perimeter members are of a substantially equal length L, and the distance D1 is less than or equal to said length L.

16. A system for building a two- or three-dimensional framework, comprising a plurality of substantially identical structure components each of which comprises a beam portion and substantially identical coupling means at each end of said beam portion for linearly and/or perpendicularly interconnecting said beam portion with another beam portion, each of said coupling means comprising means for joining together six structural components, including (a) a butterfly-type projecting member comprising first and second projecting members each having a cross-section tapered from a narrow end to a wide end and disposed with respect to one another such that (i) the narrow end of said first projecting member is adjacent the narrow end of said second projecting member and (ii) first and second internal recesses are formed between said first and second projecting members; and (b) first, second, third and fourth perimeter members disposed around said butterfly-type projecting member such that first and second perimeter recesses are respectively formed adjacent the wide ends of said first and second projecting members and third and fourth perimeter recesses are respectively formed adjacent said first and second internal recesses; said projecting members and perimeter members being attached to or integral with a common base.

17. The system recited in claim 16, further comprising at least one origination/termination component comprising a substantially flat portion and coupling means for coupling to at least one structural member.

18. The system recited in claim 16, further comprising a baseboard comprising means for receiving a plurality of said structural components.

19. The system recited in claim 16, wherein at least one of said beam portions comprises a substantially solid beam.

20. The system recited in claim 16, wherein each coupling means is substantially symmetrical about a plane passing through its center.

21. The system recited in claim 20, wherein each of said first and second projecting members has a substantially triangular cross-section.

22. The system recited in claim 21, wherein respective cross-sections of said first and second projecting members each include a right angle.

23. The system recited in claim 22, wherein first and second projecting members each include a notched portion.

24. The system recited in claim 23, wherein said first, second, third and fourth perimeter members each include a laterally extended portion.

25. The system recited in claim 24, wherein said first and second projecting members extend a prescribed distance D1 above said first, second, third and fourth perimeter members, said perimeter members are of a substantially equal length L, and the distance D1 is less than or equal to said length L.

* * * * *